United States Patent
Watanabe et al.

(10) Patent No.: US 10,016,898 B2
(45) Date of Patent: *Jul. 10, 2018

(54) ROBOT SYSTEM USING A VISION SENSOR

(71) Applicant: FANUC CORPORATION, Yamanashi (JP)

(72) Inventors: Atsushi Watanabe, Yamanashi (JP); Yuuki Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/196,046

(22) Filed: Jun. 29, 2016

(65) Prior Publication Data

US 2017/0001312 A1  Jan. 5, 2017

(30) Foreign Application Priority Data

Jun. 30, 2015  (JP) .................... 2015-131632

(51) Int. Cl.
*G05B 15/00* (2006.01)
*G05B 19/00* (2006.01)
*B25J 9/16* (2006.01)
*B25J 19/06* (2006.01)
*F16P 3/14* (2006.01)

(52) U.S. Cl.
CPC .......... *B25J 9/1697* (2013.01); *B25J 9/1674* (2013.01); *B25J 19/06* (2013.01); *F16P 3/142* (2013.01); *G05B 2219/40202* (2013.01)

(58) Field of Classification Search
CPC ........ B25J 9/1697; B25J 9/1674; B25J 19/06; B25J 9/16; F16P 3/142; G05B 2219/40202; G05B 2219/40203; Y10S 901/47; Y10S 901/49
See application file for complete search history.

(56) References Cited

U.S. PATENT DOCUMENTS

2002/0186299 A1* 12/2002 Cofer ..................... B60K 35/00
                                                               348/148
2003/0076224 A1*  4/2003 Braune ................... F16P 3/142
                                                               340/500

(Continued)

FOREIGN PATENT DOCUMENTS

CN        1802239 A     7/2006
CN       101396829 A    4/2009

(Continued)

*Primary Examiner* — Rachid Bendidi
(74) *Attorney, Agent, or Firm* — Hauptman Ham, LLP

(57) ABSTRACT

The robot system includes an imaging unit, an image processing unit, an entry request unit for a person to request entry to a predetermined section, and a signal output unit which, in a case where the person has requested entry into the predetermined section, outputs, depending on a processing result of the image processing unit, an entry permission signal indicating that the person is permitted to enter the predetermined section. If the image processing unit detects that the robot has reached a stopping position taught in advance after the person requested to enter the predetermined section, at least one of an instruction to stop the robot and an instruction to stop a part of the robot system which is necessary to enable the person to enter therein is outputted, and the signal output unit outputs the entry permission signal.

16 Claims, 6 Drawing Sheets

(56) References Cited

U.S. PATENT DOCUMENTS

| | | | |
|---|---|---|---|
| 2004/0125206 A1* | 7/2004 | Lohmann | B25J 9/1674 348/155 |
| 2004/0182995 A1* | 9/2004 | Braune | G01S 17/026 250/221 |
| 2005/0207618 A1* | 9/2005 | Wohler | B25J 9/1674 382/103 |
| 2007/0096674 A1* | 5/2007 | Hashimoto | B25J 9/1674 318/568.13 |
| 2008/0150467 A1* | 6/2008 | Hashimoto | B25J 9/1676 318/568.17 |
| 2008/0273758 A1* | 11/2008 | Fuchs | G01C 11/06 382/106 |
| 2008/0316310 A1* | 12/2008 | Braune | F16P 3/14 348/143 |
| 2009/0072631 A1* | 3/2009 | Iida | B25J 19/06 307/326 |
| 2009/0295580 A1* | 12/2009 | Inoue | B25J 9/0093 340/555 |
| 2010/0179690 A1* | 7/2010 | Matthias | B25J 9/1676 700/253 |
| 2012/0123563 A1* | 5/2012 | Drinkard | F16P 3/144 700/13 |
| 2012/0163953 A1* | 6/2012 | Murano | B25J 9/0093 414/788.1 |
| 2013/0154825 A1* | 6/2013 | Anderson | F16P 3/147 340/539.11 |
| 2013/0197694 A1* | 8/2013 | Harada | G01J 1/02 700/254 |
| 2013/0245821 A1* | 9/2013 | Nakamura | B25J 19/06 700/245 |
| 2014/0244004 A1* | 8/2014 | Scott | B25J 9/1676 700/56 |
| 2014/0244037 A1* | 8/2014 | Scott | B25J 9/1694 700/253 |
| 2014/0288711 A1* | 9/2014 | Sawada | B25J 9/1697 700/259 |
| 2015/0049911 A1* | 2/2015 | Doettling | F16P 3/142 382/103 |
| 2016/0104046 A1* | 4/2016 | Doettling | F16M 11/105 382/103 |

FOREIGN PATENT DOCUMENTS

| | | |
|---|---|---|
| CN | 103302658 A | 9/2013 |
| DE | 10 2008 060 004 A1 | 5/2010 |
| DE | 10 2010 050 547 A1 | 5/2012 |
| DE | 10 2014 209 371 A1 | 11/2014 |
| EP | 0805738 A1 | 11/1997 |
| JP | 60-16386 A | 1/1985 |
| JP | 62-58190 U | 4/1987 |
| JP | 5-77179 A | 3/1993 |
| JP | 11-33975 A | 2/1999 |
| JP | 2001-320698 A | 11/2001 |
| JP | 2001-525263 A | 12/2001 |
| JP | 2004-154916 A | 6/2004 |
| JP | 2004-276154 A | 10/2004 |
| JP | 2006-21322 A | 1/2006 |
| JP | 2007-118141 A | 5/2007 |
| JP | 4405468 B | 1/2010 |
| JP | 2012-223831 A | 11/2012 |
| JP | 2013-161253 A | 8/2013 |
| JP | 5582422 B | 9/2014 |
| JP | 2015-85491 A | 5/2015 |
| WO | 96/22860 A1 | 8/1996 |

* cited by examiner

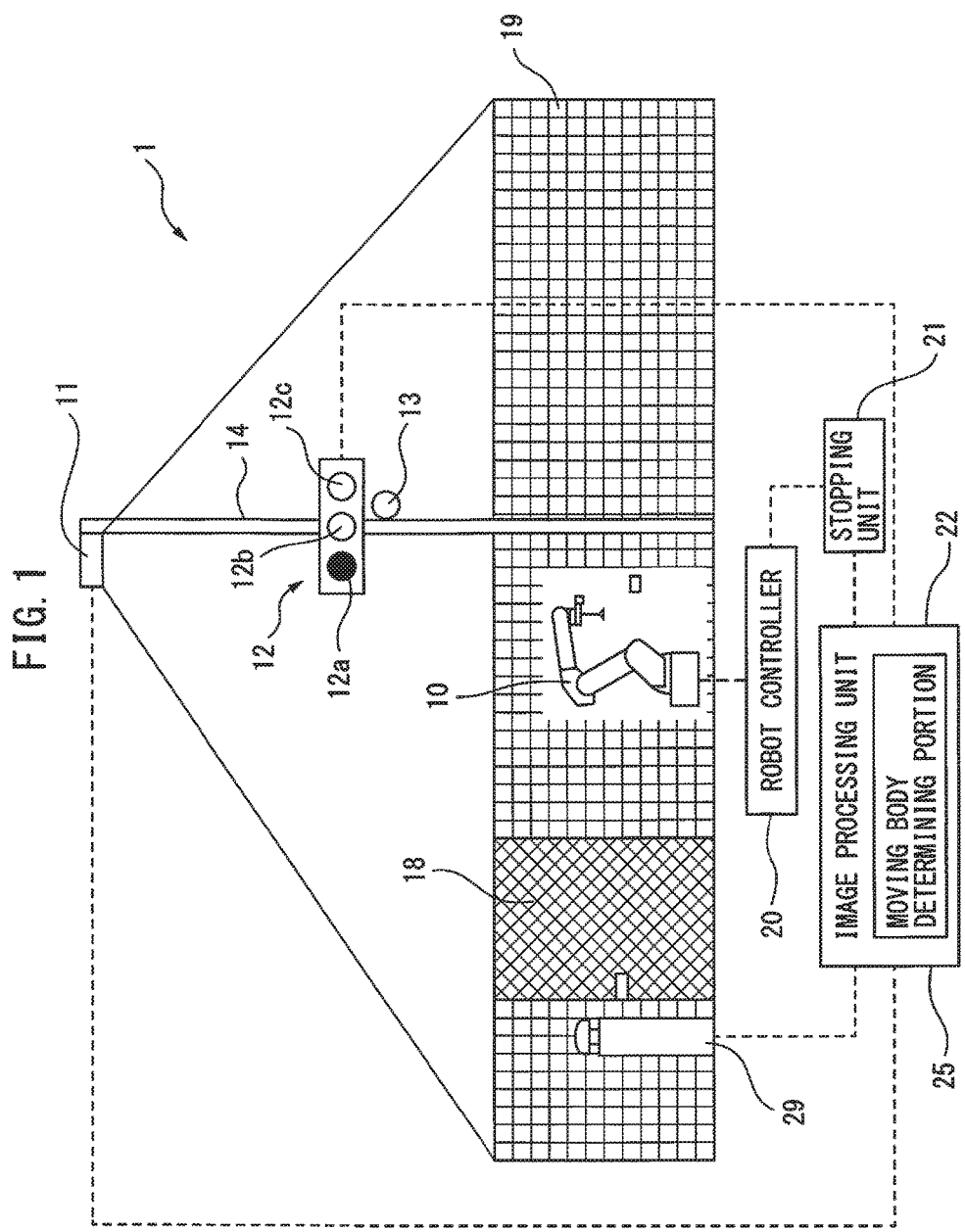

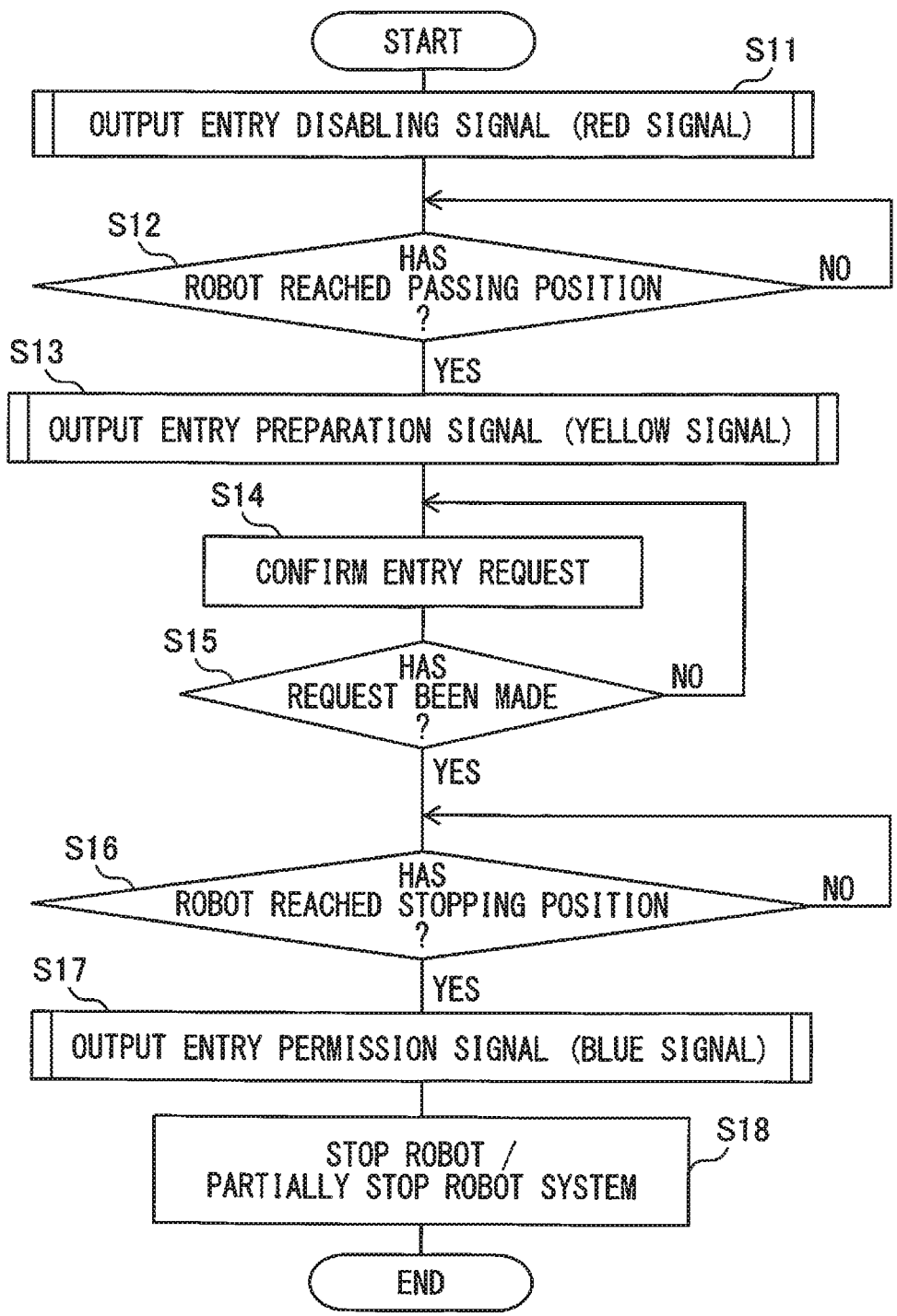

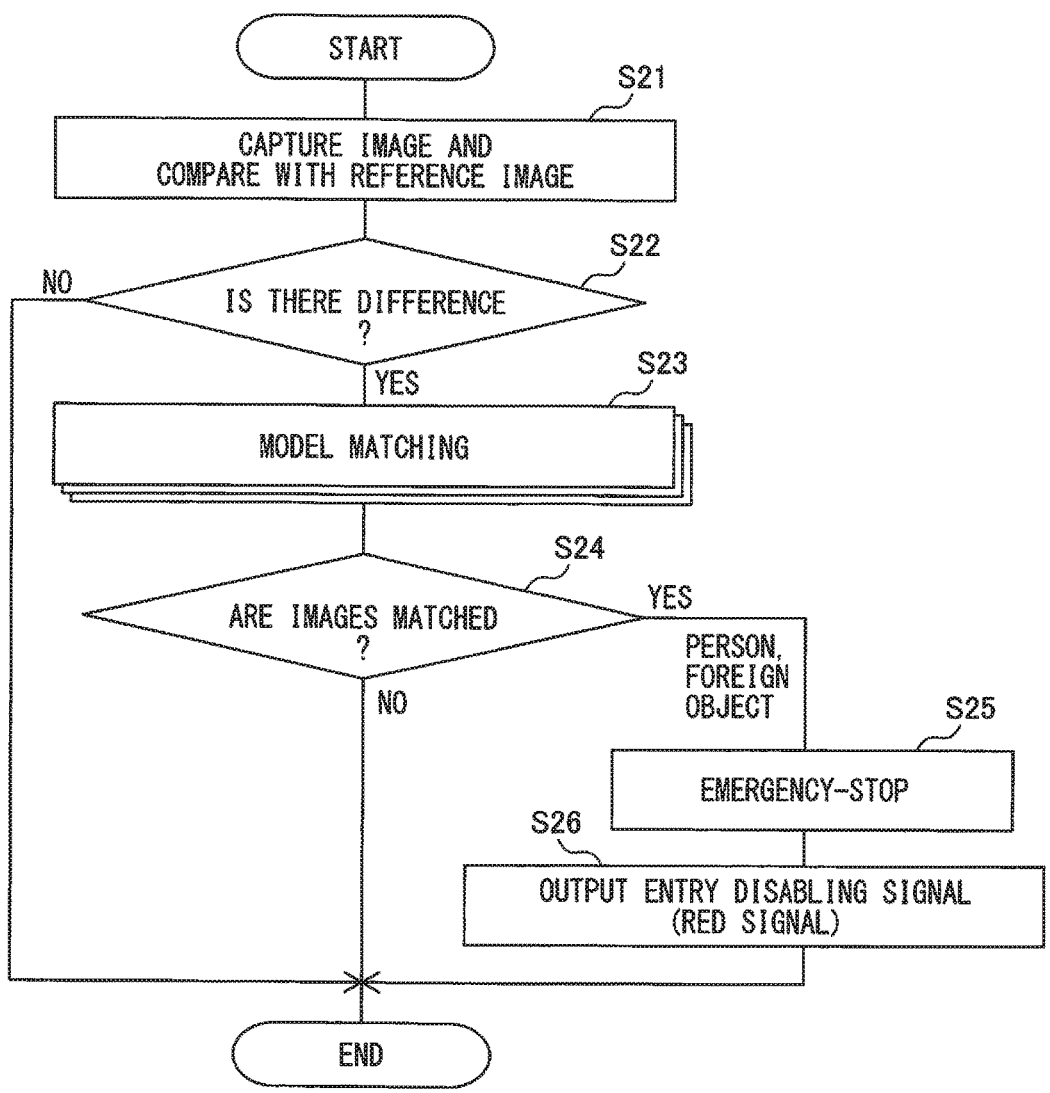

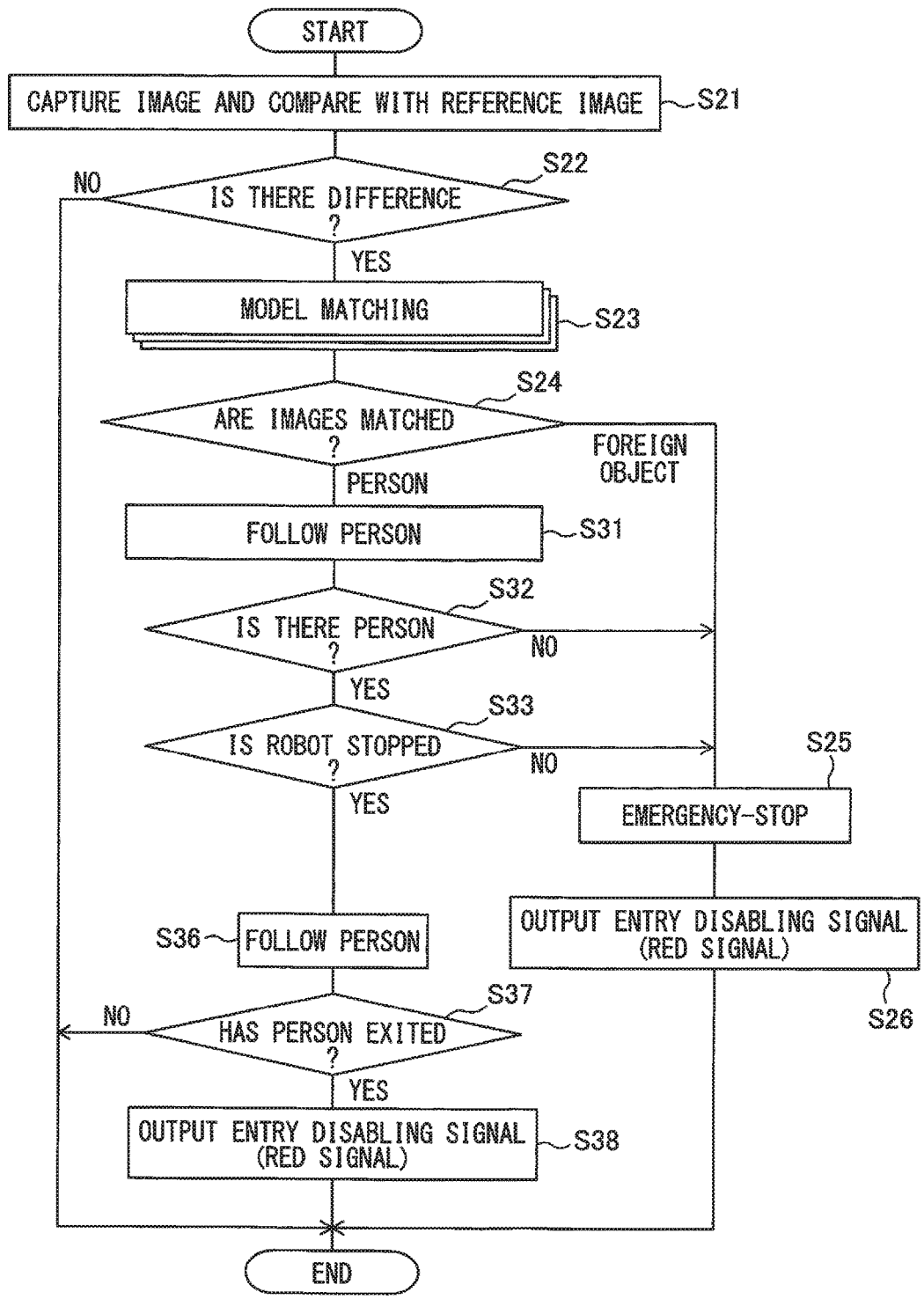

ROBOT SYSTEM USING A VISION SENSOR

RELATED APPLICATIONS

The present application claims priority to Japanese Patent Application Number 2015-131632 filed Jun. 30, 2015, the disclosure of which is hereby incorporated by reference herein in its entirety.

BACKGROUND OF THE INVENTION

1. Field of the Invention

The present invention relates to a robot system that improves human safety with a vision sensor.

2. Description of the Related Art

Japanese Patent No. 5582422 discloses a robot system in which a robot moves in an operating area to which human access is restricted. Generally, if the robot is stopped at that point of time, it is inconvenient. If the presence of a person in the operating area is detected when the robot is performing a step of work, it takes the robot another step before it stops.

Further, Japanese Unexamined Patent Publication (Kokai) No. 5-77179 discloses a robot system in which if a maintenance request signal is inputted when a robot is in motion, the robot continues its operation up to the end of a block when the maintenance request signal was inputted, and then suspends work, and thereafter, the robot moves to a predetermined position where it is suitable for workers to perform maintenance work.

Further, Japanese Patent No. 4405468 discloses that images recorded by a first image recording unit and a second image recording unit are analyzed through at least two different methods, and then, the robot is stopped when a foreign object is detected by any of the methods.

SUMMARY OF THE INVENTION

However, in Japanese Patent No. 5582422, it is necessary to define such an inconvenient stage in advance and to take it into consideration when programming. If the technique disclosed in Japanese Patent No. 5582422 is applied to an existing robot system, it is necessary to change software programs of the robot system and circuits of a controller thereof. These changes involve relatively high cost and considerable trouble. Further, changing software programs and circuits requires a high degree of skill and care by workers and only a limited number of workers can do such work. It is difficult to freely make such changes where the robot system is situated. Further, if there is an error in these changes, the changed robot system can pose a danger to people. Generally, program changes, etc., of the existing robot systems are not actively made.

In the system of Japanese Unexamined Patent Publication (Kokai) No. 5-77179, it is necessary to previously establish information on the predetermined posture which is suitable for workers to perform maintenance work and information to move the robot to the predetermined posture. Further, in the system of Japanese Unexamined Patent Publication (Kokai) No. 5-77179, after the maintenance request signal is inputted, the robot is temporarily stopped at a block end. Therefore, when the robot moves from the stopping position (at the block end) to the predetermined position for the maintenance work, there is a possibility that the robot will contact an obstacle. There is the same problem when the robot returns to the stopping position after the maintenance work.

Further, in Japanese Patent No. 4405468, the stopping position of the robot is a position when a foreign object is detected, and therefore, it is difficult to establish such a stopping position of the robot. Further, depending on the stopping position of the robot, it may be difficult to restart the operation of the robot.

The present invention was made in light of the circumstances described above and has an object to provide a robot system which is applicable to an existing system without changing the programs, etc., and which does not pose a danger to people.

To achieve the above object, according to a first aspect of the present invention, there is provided a robot system including a robot which is provided in a robot operating section, and a robot controller which controls the operation of the robot in the robot operating section, comprising: an imaging unit for imaging a predetermined section which includes at least a portion of the robot operating section; an image processing unit which processes images taken by the imaging unit; an entry request unit which is to be operated when a person requests to enter the predetermined section; and a signal output unit which, in a case where the person has requested through the entry request unit to enter the predetermined section, outputs, depending on a processing result of the image processing unit, an entry permission signal indicating that the person is permitted to enter the predetermined section; wherein if the image processing unit detects that the robot has reached a stopping position taught in advance after the person requested to enter the predetermined section, at least one of an instruction to stop the robot and an instruction to stop a part of the robot system which is necessary to enable the person to enter therein is outputted, and the signal output unit outputs the entry permission signal.

According to a second aspect of the present invention, in the robot system according to the first aspect, wherein the signal output unit outputs, depending on a processing result of the image processing unit, at least either one of an entry disabling signal indicating that the person is not permitted to enter the predetermined section when the robot is operating and the entry permission signal.

According to a third aspect of the present invention, in the robot system according to the first aspect, if it is detected by the image processing unit that the person has exited the predetermined section, the portion of the robot system or the robot is configured to be restarted.

According to a fourth aspect of the present invention, in the robot system according to any of the first to third aspects, if it is detected by the image processing unit, after the signal output unit outputted the entry permission signal, that the operation of the robot has been started, at least one of the portion of the robot system and the robot is configured to be stopped.

According to a fifth aspect of the present invention, in the robot system according to any of the first to fourth aspects, the image processing unit includes a moving body determining portion which determines that a moving body which includes a worn article image model of an article worn by the person is the person and which determines that a moving body which does not include the worn article image model is a foreign object, and wherein if the moving body which was determined as being the foreign object by the moving body determining portion is detected in the predetermined section, at least one of the portion of the robot system and the robot is configured to be stopped.

According to a sixth aspect of the present invention, in the robot system according to any of the first to fifth aspects, if the image processing unit loses sight of the person before it detects that the person has exited the predetermined section, at least one of the portion of the robot system and the robot is configured to be stopped.

According to a seventh aspect of the present invention, in the robot system according to any of the first to sixth aspects, if the moving body determining portion determines that a moving body in the predetermined section is the person before the signal output unit outputs the entry permission signal, at least one of the portion of the robot system and the robot is configured to be stopped.

According to a eighth aspect of the present invention, in the robot system according to any of the first to seventh aspects, the stopping position is set on the path of operation of the robot and is taught in advance.

According to a ninth aspect of the present invention, in the robot system according to the second aspects, the signal output unit includes at least one of a first output portion which outputs the entry permission signal and a second output portion which outputs the entry disabling signal, in the case where the signal output unit includes only the first output portion, the person is not permitted to enter the predetermined section when the first output portion does not output the entry permission signal, with the first output portion being disposed such that it is recognizable to the person, in the case where the signal output unit includes only the second output portion, the person is permitted to enter the predetermined section when the second output portion does not output the entry disabling signal, with the second output portion being disposed such that it is recognizable to the person, and in the case where the signal output unit includes the first output portion and second output portion, the first output portion and second output portion are disposed such that they are recognizable to the person.

According to a tenth aspect of the present invention, in the robot system according to any of the first to ninth aspects, the stopping position is set on the path of working motion of the robot and is taught in advance, wherein a passing position of the robot is taught at a predetermined distance upstream from the stopping position on the path, and wherein when it is detected by the image processing unit that the robot has reached the passing position, the signal output unit is configured to output an entry preparation signal which indicates that the entry request unit is operable by the person.

According to an eleventh aspect of the present invention, in the robot system according to any of the first to ninth aspects, the stopping position is defined as a space of predetermined size, and wherein when it is detected by the image processing unit that the robot has reached the space, it is determined that the robot has reached the stopping position.

According to a twelfth aspect of the present invention, in the robot system according to the tenth aspect, the stopping position or the passing position is defined as a space of predetermined size, and wherein when it is detected by the image processing unit that the robot has reached the space, it is determined that the robot has reached the stopping position or the passing position.

According to a thirteenth aspect of the present invention, in the robot system according to the tenth or twelfth aspect, the signal output unit includes a first output portion which outputs an entry permission signal, a second output portion which outputs an entry disabling signal indicating that the person is not permitted to enter the predetermined section, and a third output portion which outputs the entry preparation signal, and wherein the first output portion, the second output portion, and the third output portion are disposed such that they are recognizable to the person.

According to a fourteenth aspect of the present invention, in the robot system according to the ninth or thirteenth aspect, the entry permission signal, the entry disabling signal, and the entry preparation signal are outputted either visually or audibly, or both such that they are different from one another.

According to a fifteenth aspect of the present invention, in the robot system according to any of the first to fourteenth aspects, the robot controller is configured to stop the robot either after decelerating or by cutting off the power of the robot.

In the first aspect of the present invention, when the robot reaches the stopping position, the robot is stopped at the stopping position and the robot system is partly stopped, and then, the entry permission signal is outputted. Since the robot, etc., is already stopped when the entry permission signal is outputted, the person can safely enter the predetermined section. In other words, even if a person requests to enter the predetermined section, the person is not permitted to enter the predetermined section, as long as the robot is in motion.

Further, the first aspect of the present invention is applicable to existing robot systems, without any change to the robot, simply by installing the imaging unit and by teaching the stopping position of the robot to the image processing unit. It is not necessary to change software programs and circuits.

In the second aspect of the present invention, the person is not permitted to enter the predetermined section when the entry disabling signal is outputted, whereas the person is permitted to enter the predetermined section when the entry permission signal is outputted.

In the third aspect of the present invention, since the robot, etc., is restarted after the person exits the predetermined section it is possible to ensure the safety of the person.

In the fourth aspect of the present invention, if the robot starts moving when the robot should be stopped, it is possible to emergency-stop the robot, etc. Thus, it is possible to ensure the same level of safety as when emergency-stopped in advance. In other words, even if it is a section where entry is permitted after emergency-stopping the robot, etc., the present invention enables the person to enter such a section without emergency-stopping the robot, etc. Therefore, even if there is a portion to which workers cannot sufficiently perform maintenance work in an emergency-stop condition, the present invention enables such maintenance work to be performed. Further, when the robot is restarted, it is possible to do away with the influence caused by the emergency-stop.

In the fifth aspect of the present invention, it is determined that a moving body which does not include the worn article image model (for example, helmet, cap, budge, etc.,) is a foreign object, and therefore, it is possible to easily judge a foreign object. If a moving body which includes the worn article image model, i.e., a person is detected in the predetermined section, the robot, etc., is not stopped and the person can continue to work. A person who does not wear the article to be worn is one who is not permitted to work in the predetermined section, and is determined to be a foreign object in the predetermined section. Accordingly, the robot, etc., is emergency-stopped and it is possible to ensure the safety of that person.

In the sixth aspect of the present invention, if the image processing unit loses sight of a person in the predetermined section, the robot, etc., is stopped accordingly, ensuring the safety of the person.

In the seventh aspect of the present invention, if a person is detected in the predetermined section when it is not permissible for the person to enter the predetermined section, the robot, etc., is stopped, ensuring the safety of the person.

Places which are suitable for workers to perform maintenance work are often on the path of operation of the robot. In the eighth aspect of the present invention, when the robot is stopped for maintenance work, it is possible to restart the robot very smoothly after the maintenance work.

In the ninth aspect of the present invention, by simply referring to at least one of the output portions, it is possible for a person to easily determine whether or not it is now safe to enter the predetermined section. Further, it is possible to reduce the number of the output portions.

In the tenth aspect of the present invention, when the robot reaches the passing position, the entry preparation signal is outputted. Thereafter, if a person requests to enter the predetermined section, the person is permitted to enter therein accordingly. As such, it is possible for the person to easily find the right timing to make the request.

In the eleventh and twelfth aspects of the present invention, since the stopping position, etc., is defined as a space of predetermined size, it is possible to give a margin to the stopping position, etc.

In the thirteen aspect of the present invention, since the signal output unit includes three portions, i.e., the first output portion to the third output portion, it is possible to form the signal output unit similar to traffic light signals. In this instance, people can easily recognize signals which the signal output unit outputs.

In the fourteenth aspect of the present invention, it is possible to form the signal output unit of a relatively simple structure.

In the fifteenth aspect of the present invention, in the case that the robot is stopped after deceleration, it is possible to ease the burden on the robot, and in the case that the robot is stopped by cutting off the power of the robot, it is possible to securely stop the robot.

These objects, features, and advantages of the present invention and other objects, features, and advantages will become further clearer from the detailed description of typical embodiments illustrated in the appended drawings.

BRIEF DESCRIPTION OF THE DRAWINGS

FIG. 1 is a schematic view of a robot system in accordance with the present invention.

FIG. 2 is a flow chart illustrating the basic operation of the robot system in accordance with the present invention.

FIG. 4 is a first flow chart illustrating the operation of the robot system.

FIG. 5 is a second flow chart illustrating the operation of the robot system.

DETAILED DESCRIPTION

Figure 3A:
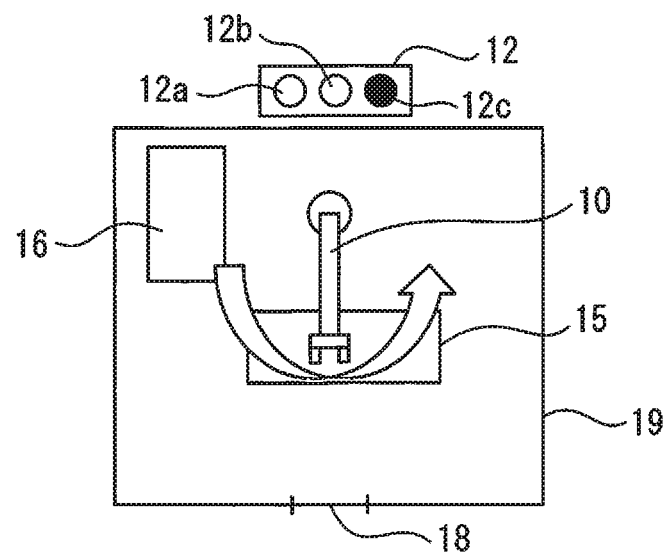
FIG. 3A is a first view illustrating an image taken by a vision sensor together with a signal output unit.

With reference to the appended drawings, a description will now be made of embodiments of the present invention. In the following figures, similar members are given similar reference numerals. These figures are properly modified in scale to assist the understanding thereof.

FIG. 1 illustrates an outline of the robot system based on the present invention. As seen in FIG. 1, the robot system 1 of the present invention includes a robot 10 and a robot controller 20 which controls the robot 10. Further, FIG. 1 also illustrates a vision sensor 11, the field of view of which includes the robot 10 and the perimeter thereof, and an image processing unit 25 which processes images captured by the vision sensor 11 to output various signals.

The robot 10 is an industrial robot 10, for example, an articulated robot 10. The vision sensor 11 is mounted at the top of a post 14 disposed in the vicinity of the robot 10 and is used to capture images of the robot 10, etc., from above. The vision sensor 11 includes a camera which incorporates a Time-of-Flight (TOF) area sensor device, and also includes an LED lighting device. The vision sensor 11 measures a returning time of reflected light of LED light to capture a two-dimensional depth image.

Further, with reference to FIG. 1, a safety fence 19 with a door 18 is disposed around the robot 10. The safety fence 19 defines a predetermined section which includes at least a robot operating section where the robot 10 works. The field of view of the vision sensor 11 includes a predetermined section including at least a portion of the robot operating section. Note that the predetermined section may be defined by different means other than the safety fence 19, i.e., by using, for example, a white marking line provided on the floor. Further, the vision sensor 11 captures images of the predetermined section from above.

Images taken at each designated time by the vision sensor 11 are processed by the image processing unit 25 of the robot controller 20. With this provision, a person or foreign object which enters the predetermined section is detected as described below. By carrying out this process at predetermined time intervals, it is also possible to follow or track a person or something to a certain extent.

Image models of a person, a person's worn article, the robot 10 and robot operating area are previously taught to the image processing unit 25. The image processing unit 25 performs matching of these model images and images taken by the vision sensors 11 such that a person and the robot 10, etc., are specified and detected. The model images are formed by extracting characterizing portions of a person and the robot 10 from preprocessed reference images (described below).

The image processing unit 25 determines, by using images taken by the vision sensor 11, whether or not it is permissible for a person to safely enter the predetermined section in the safety fence 19, and then, causes a signal output unit 12 to output a determining result. The signal output unit 12 is mounted to the post 14 below the vision sensor 11. Note that the signal output unit 12 may be placed in other locations.

Further, as shown in FIG. 1, an entry request unit 29, for example, a push-button is disposed in the vicinity of the door 18 of the safety fence 19. By operating the entry request unit 29, a person may convey to the image processing unit 25 his intention to enter the predetermined section.

As can be seen from FIG. 1, the signal output unit 12 includes a plurality, for example, three output portions 12a, 12b, and 12c. In accordance with the results of the processing from the image processing unit 25, the signal output unit 12 outputs a corresponding signal through either one of the first output portion 12a to the third output portion 12c. The first output portion 12a to the third output portion 12c are disposed such that they are recognizable to people or such that they are recognized by a person.

The first output portion 12a of the signal output unit 12 outputs an entry permission signal which indicates that the person is permitted to enter the predetermined section in a state where a person requests entry into the predetermined section via the entry request unit 29. Further, the second output portion 12c outputs an entry disabling signal which indicates that the person is not permitted to enter the predetermined section due to the fact that the robot is in motion.

Further, the third output portion 12b outputs an entry preparation signal which indicates a state in which the entry request unit 29 is operable by a person. Note that the "state in which the entry request unit 29 is operable by a person" means that, when the entry request unit 29 is actually operated, the entry permission signal is outputted depending on a processing result of the image processing unit 25.

In other words, when the entry preparation signal is outputted, the robot 10 reaches a position between a stopping position taught to the image processing unit 25 and a later-described passing position such that it is ready to permit the person to enter the predetermined section. Accordingly, if a person operates the entry request unit 29 when the entry preparation signal is outputted, the entry preparation signal is switched to the entry permission signal, depending on a processing result of the image processing unit 25. Note that if a person operates the entry request unit 29 when the entry disabling signal is outputted, this operation is not accepted because the entry preparation signal is not outputted, and therefore, the entry permission signal is not outputted and the entry disabling signal is continuously outputted.

Further, preferably, the output portions 12a to 12c are light emitters, for example, light emitters which emit lights that are different in color from one another. It is preferable, for example, that the first output portion 12a which outputs the entry permission signal is a light emitter which emits blue light, the third output portion 12b which outputs the entry preparation signal is a light emitter which emits yellow light, and the second output portion 12c which outputs the entry disabling signal is a light emitter which emits red light. It is understood that the signal output unit 12 is so mechanically similar to those of traffic light signals, and therefore, a person may easily determine whether it is currently safe to enter the predetermined section.

As shown in FIG. 1, an audio output unit 13, for example, a speaker is disposed in the vicinity of the signal output unit 12. In place of or in cooperation with the signal output unit 12, the audio output unit 13 may be structured such that it outputs mutually different sounds or tones which respectively correspond to the entry disabling signal, the entry preparation signal and the entry permission signal.

Further, as shown in FIG. 1, the robot controller 20 is connected to a stopping unit 21. The stopping unit 21 outputs, depending on a processing result of the processing unit 25, an instruction to stop the robot 10 as well as an instruction to stop a portion of the robot system 1 which is necessary to enable the person to enter therein.

The instruction to stop the robot 10 is, for example, an instruction for stopping the robot 10 after the deceleration thereof. In this instance, it is possible to ease the burden on the robot 10. Alternatively, the instruction to stop the robot 10 may be an instruction for cutting off the power of the robot 10. With this provision, it is possible to certainly stop the robot 10. Further, the stopping unit 21 may stop the aforesaid portion of the robot system 1 and/or the robot 10.

Further, the image processing unit 25 includes a moving body determining portion 22, which determines that a moving body which includes a worn article model image of a person's worn article is a person and also determines that a moving body which does not include the worn article model image is a foreign object. The aforesaid person's worn article is, for example, a helmet, cap, badge, etc., which is required to be worn by a person. With this provision, it is easy to determine whether it is a foreign object or not.

Figure 3B:
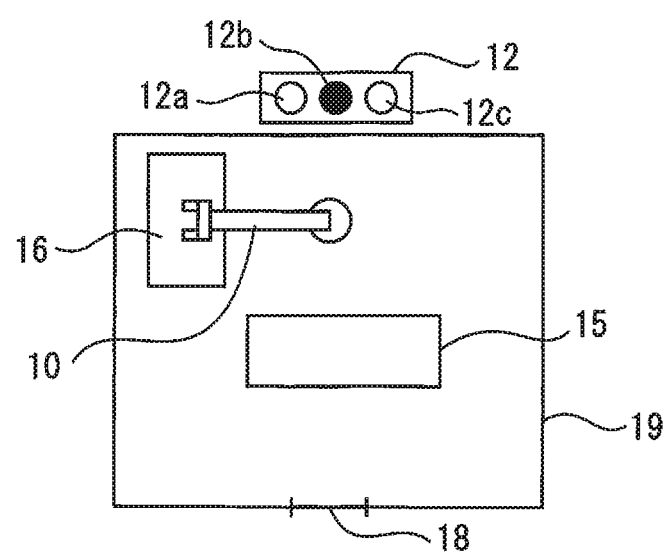
FIG. 3B is a second view illustrating an image taken by the vision sensor together with the signal output unit.
Figure 3C:
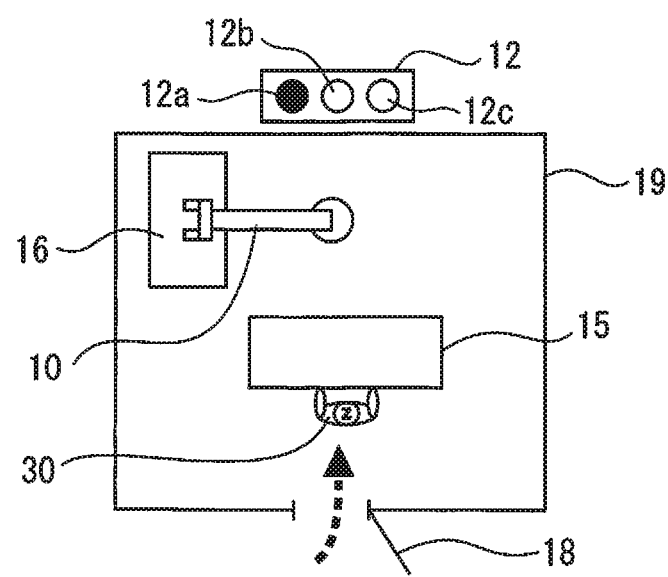
FIG. 3C is a third view illustrating an image taken by the vision sensor together with the signal output unit.

FIG. 2 is a flow chart which illustrates the basic operation of the robot system 1 according to the present invention. Further, FIGS. 3A to 3C are views illustrating images captured by the vision sensor and also illustrate operating states of the signal output unit corresponding to the respective images.

As described above, the vision sensor 11 is mounted at the top of the post 14. Therefore, the images taken by the vision sensor 11 correspond to a plan view of the predetermined section inside the safety fence 19. The images illustrated in FIGS. 3A to 3C include the robot 10 which is present in the predetermined section and a first peripheral equipment 15 and a second peripheral equipment 16 which are disposed around the robot 10. As can be seen from FIGS. 3A to 3C, the second peripheral equipment 16 is positioned farther from the door 18 than the first peripheral equipment 15.

Further, the reference images described above are previously registered in the image processing unit 25. The reference images are images which, when the robot 10 has reached the stopping position taught to the image processing unit 25 or the passing position (described below in detail), are captured by the vision sensor 11. For example, in the image shown in FIG. 3B, the robot 10 stops in a position above the second peripheral equipment 16 and an intruder or something, such as a person 30, a foreign object, etc., is not present inside the safety fence 19. In this instance, the reference images are previously taught to the image processing unit 25 such that the robot 10 can stop in the position above the second peripheral equipment 16. According to the present invention, images previously captured are used as reference images in this way.

Note that a plurality of stopping positions may be taught, and in this instance, a plurality of reference images, each corresponding to each of the stopping positions and its corresponding passing position, are registered. In such instance, only by moving the robot 10 to the stopping position or the passing position and by imaging by the vision sensor 11, it is possible to easily teach the position of the robot in the robot system 1. Further, the stopping position and the passing position of the robot 10 are displayed, based on the reference image, on a display of an operation panel (not shown) connected to the image processing unit 25, and therefore, it is possible for an operator to intuitively acquire information on the stopping position, etc., of the robot 10.

Further, it is preferable that the stopping position is set on the path of operation of the robot 10 when the robot operates in accordance with a predetermined operation program. In view of maintenance work for e.g., the robot 10, places which are suitable for workers to do maintenance work are often on the path of working motion of the robot. Therefore, when the stopping position is on the path of working motion of the robot, it is possible to easily perform maintenance work, and further, it is possible to restart the robot very smoothly after the maintenance work.

With reference to FIG. 2 etc., a description will now be made of the basic operation of the robot system according to the present invention. The contents illustrated in FIG. 2 etc., are those which are carried out when the robot 10 operates according to a predetermined operation program. The stopping positions taught to the image processing unit 25 are set to be on the path of operation of the robot 10.

At the beginning, at step S11 of FIG. 2, it is determined that it is dangerous for a person to enter the predetermined section inside the safety fence 19, since the robot 10 is in motion. Accordingly, the second output portion 12*c* of the signal output unit 12 outputs the entry disabling signal, for example, a red signal (refer to FIG. 3A).

At step S12, the current image taken by the vision sensor 11 and the reference image of the passing position are compared. In this instance, the reference image of the passing position includes the model image of the robot 10 positioned at the passing position, and the image processing unit 25 performs model matching with respect thereto, and then, based on the matching result, the process determines that the robot 10 has reached the passing position. Note that the passing position is set to be a predetermined distance upstream from the stopping position on the path of operation of the robot 10. At step S12, if the process determines that the current position of the robot matches the passing position, then it proceeds to step S13.

At this point, since the robot 10 is currently in the vicinity of the stopping position, the system comes close to a condition where it is permissible for a person to enter the predetermined section, and therefore, it can be determined that it is ready to permit the person to enter therein. Thus, at step S13, the entry disabling signal, for example, a red signal by the second output portion 12*c* is switched to the entry preparation signal, for example, a yellow signal by the third output portion 12*b* (refer to FIG. 3B).

Then, at step S14, the process confirms whether the request to enter has been made via the entry request unit 29, and at step S15, if it determines that the request has been made, then it proceeds to step S16.

At step S16, the current image taken by the vision sensor 11 and the reference image of the stopping position are compared. In this instance, the reference image of the stopping position includes the model image of the robot 10 positioned at the stopping position, and the image processing unit 25 performs model matching with respect thereto, and then, based on the matching result, the process determines that the robot 10 has reached the stopping position.

If the process determines that the robot 10 has reached the stopping position taught to the image processing unit 25, the robot is stopped (step S18), and therefore, it proceeds to step S17 because it is no longer dangerous for a person to enter the predetermined section inside the safety fence 19.

At step S17, the entry preparation signal, for example, a yellow signal by the third output portion 12*b* is switched to the entry permission signal, for example, a blue signal by the first output portion 12*a* (refer to FIG. 3C). Thus, in the present invention, if the request to enter is made when the entry preparation signal, for example, yellow signal is outputted, the entry permission signal, for example, a blue signal is outputted accordingly. Therefore, a person may easily find the right timing to request to enter.

Then, at step S18, the stopping unit 21 outputs an instruction to stop the robot 10. Thus, the robot 10 remains stationary at the stopping position. Further, the stopping unit 21 also outputs an instruction to stop a portion of the robot system 1 which is necessary to enable the person to enter therein. Additionally, the door 18 may be unlocked. As shown in FIG. 3C, in this condition, even if a person 30 enters the predetermined section, there is no danger to the person because the robot, etc., is not in motion. The foregoing description describes the basic operation of the robot system 1 of the present invention.

Note that a person may request to enter by using hand signals instead of operating the entry request unit 29. In this instance, model images corresponding to the hand signals are previously registered in the image processing unit 25 and the image processing unit 25 determines by performing model matching whether the request to enter has been made or not. Consequently, it is possible to completely eliminate the entry request unit 29.

Then, a description will be made of the operations of the robot system 1 with respect to each kind of signal which the signal output unit 12 outputs. First, with reference to FIGS. 3A to 3C and FIG. 4, a description will be made of the operations of the robot system when the entry disabling signal, for example, red signal or the entry preparation signal, for example, yellow signal is outputted. The contents shown in FIG. 4 are repeated at predetermined control intervals.

In FIG. 4, an image is taken in the predetermined section by the vision sensor 11 when the entry disabling signal, for example, red signal is outputted, and then, this image is defined as the reference image for condition monitoring. When the reference image is taken, the entry disabling signal, for example, red signal is outputted, and therefore, there should be no moving body such as a person or a foreign object in the predetermined section.

At step S21 of FIG. 4, the vision sensor 11 captures images of the predetermined section within the safety fence 19 and then comparison between the thus captured image and the reference image for condition monitoring is carried out. At step S22, if there is a difference between these images, then the process proceeds to step S23. Then, at step S23, the moving body determining portion 22 of the image processing unit 25 determines by using the model matching technique whether or not the robot 10, a person 30, or a foreign object exists in the images.

At step S24, if the robot 10 is firstly determined as being matched through the model matching process, then model matching is carried out with respect to the person or the foreign object, excluding that portion of the robot 10. When it is determined as being matched with the aforesaid worn article model image, for example, a helmet model image, then the moving body determining portion 22 determines that the difference is a person 30. If another difference exists which does not match with the previously registered model images, then the moving body determining portion 22 determines that this difference is a foreign object. Further, if there is no such difference, the moving body determining portion 22 determines that there is neither a person nor a foreign object in the predetermined section, and then the process ends accordingly.

If the entry disabling signal, for example, a red signal is outputted, the robot 10 is moving or in motion, and therefore, a person should not be in the predetermined section. Further, if the entry preparation signal, for example, a yellow signal is outputted, the robot 10 is positioned at the stopping position or in the vicinity thereof. However, in this instance, it is not permissible for a person to enter therein, and therefore, there should be no person in the predetermined section.

If a person is detected in the predetermined section when the entry disabling signal or the entry preparation signal is outputted, it means that the person is in the predetermined section without permission. Therefore, at step S24, if a person is detected, the process proceeds to step S25, where the robot 10 is emergency-stopped by the stopping unit 21.

It is preferable that the stopping unit 21 stops the robot 10 by cutting off the power. To this end, a necessary portion of the robot system 1 may be stopped as described above.

Note that when a foreign object is detected in step S24, a similar process is carried out. When the third output portion 12b outputs the entry preparation signal, for example, a yellow signal, at step S26, it is switched to the entry disabling signal, for example, a red signal by the second output portion 12c. Note that, when the entry disabling signal is initially outputted, the entry disabling signal is maintained in step S26.

As such, according to the present invention, through the comparison between the current image and the reference image, it is easy to identify a foreign object and a person. Note that it is preferable that a plurality of model matchings is performed through a plurality of model images, thereby improving the accuracy in identifying the person 30 and foreign objects.

With reference to FIGS. 3A to 3C and FIG. 5, a description will be made of the operation of the robot system when the entry permission signal, for example, a blue signal is outputted. The contents shown in FIG. 5 are repeated at predetermined control intervals. Further, step S21 to step S23 of FIG. 5 are similar to those described above, and a duplicate description thereof has been omitted. Note that images of the predetermined section are captured by the vision sensor 11 when the entry permission signal, for example, a blue signal has been outputted, and these images are defined as the reference images for condition monitoring in step S21.

At step S22, the robot is stopped and therefore any difference indicating the robot does not exist. Further, when it is determined as being matched with the aforesaid worn article model image, for example, a helmet model image, then the moving body determining portion 22 determines that the difference is a person 30. On the contrary, if another difference exists which does not match with the previously registered images, then the moving body determining portion 22 determines that this difference is a foreign object. Note that, if there is no such difference, the moving body determining portion 22 determines that there is neither a person nor a foreign object in the predetermined section.

If a foreign object is detected, there is a possibility that the robot 10 and peripheral equipment 15, 16 will be damaged by the foreign object. Thereafter, when the robot system is restarted, there is a possibility that the foreign object still remains at the time of restarting the robot system 1. In particular, if the foreign object is another person which does not match with the wearing article model image, there is a possibility that the robot poses a danger to that person when he carelessly approaches the robot and the robot starts moving. In this instance, the process proceeds to step S25, where the stopping unit 21 emergency-stops the robot 10 as described above. Further, as described above, the portion of the robot system 1 may be stopped. With this configuration, the above described danger can be avoided. Then, at step S26, the entry permission signal, for example, a blue signal by the first output portion 12a is switched to the entry disabling signal, for example, a red signal by the second output portion 12c.

At step S24, if a person is detected (refer to FIG. 3C), it is set to follow the person at step S31. Then, the image processing unit 25 detects the position of the person 30 through images taken at each designated time. Then, at step S32, it is determined whether the person 30 is in the predetermined section or not. This determination is carried out by checking the model matching of the person 30. If it is not possible to check the model matching or if it is determined that the image processing unit loses sight of the person 30 in the predetermined section, the process proceeds to step S25, where, as described above, a portion of the robot system 1 and/or the robot 10 is emergency-stopped. With this configuration, it is possible to ensure the safety of the person.

Further, at step S32, if the process determines that the person is in the predetermined section, then it proceeds to step S33. At step S33, the process determines through monitoring the matching position of the model matching in step S22 whether the robot 10 is stopped or not. At this point, the entry permission signal, for example, a blue signal is outputted, and therefore, the robot 10 should be stopped at the previously taught stopping position.

At step S33, if the process determines that the robot 10 is moving, it can be judged that the robot 10 is unintentionally moving for some reason. In this instance, a person in the predetermined section is in danger, and therefore, the process proceeds to step S25, where, as described above, the necessary portion of the robot system 1 and/or the robot 10 is emergency-stopped. It is understood that, according to the above process, even if a person 30 works inside the fence 19, it is possible to ensure the safety of the person 30.

Note that, although not illustrated in the figures, it is preferable that if the process determines that the robot is moving although there is no person in the predetermined section, then the necessary portion of the robot system 1 and/or the robot 10 is emergency-stopped as described above. It is thereby possible to avoid a collision between the robot 10 and the associated peripheral equipment.

Depending on the type of work a person has to carry out with respect to the robot 10, there is an area where it is necessary for the person to enter after the emergency-stop of the robot 10. In the present invention, if it is detected that the robot is moving when the entry permission signal is outputted, the robot, etc., are emergency-stopped. This means that, in the present invention, it is possible for a person to enter the aforesaid area without the need of the previous emergency-stop of the robot 10, etc. Accordingly, even if there is portion to which workers cannot sufficiently perform maintenance work in an emergency-stop condition, the present invention enables such maintenance work for that portion. Further, when the robot 10 is reactivated, it is also possible to do away with the influence caused by the emergency-stop.

Then, in step S36, if it is confirmed that the person 30 has exited the predetermined area without losing track of the person, after continuously following the person, then the process proceeds to step S37. An exit operation unit may be added to the entry request unit 29. With this configuration, by operating the exit operation unit when exiting the predetermined section, the person can indicate that he has exited the predetermined section in the safety fence 19. At step S37, it is possible to determine whether the person 30 exits the predetermined section or not as described above. At step S36, to follow the person, image model matching is repeated to determine the existence of the person 30 in the current images as described above.

If it is confirmed that the person 30 has exited the predetermined section, the entry permission signal, for example, a blue signal by the first output portion 12a is switched to the entry disabling signal, for example, a red signal by the third output portion 12b. At the same time, the robot 10 is reactivated by releasing the stopping unit 21 such that the robot system 1 is restarted. Accordingly, the robot 10 can easily continue to work in accordance with the operation program. Further, since the robot 10, etc., is reactivated after the person has exited the predetermined section the safety of the person is ensured.

Thus, in the present invention, when the robot 10 reaches the stopping position, the robot 10 is stopped at the stopping position, and at the same time, the robot system 1 is partially stopped and the entry permission signal is outputted. The robot 10 and the robot system 1 are stopped when the entry permission signal is outputted, and therefore, the person can safely enter the predetermined section in the vicinity of the robot 10. In other words, even if the person 30 makes a request to enter the predetermined section when the robot 10 is moving, it is not permissible for the person 30 to enter therein.

Note that each stopping position and passing position of the robot 10 may be taught as a space of predetermined size. If the image processing unit 25 detects that the robot has reached the spaces, it is determined that the robot 10 has reached its respective stopping positions and passing positions. This configuration gives a margin to the stopping positions, etc., of the robot 10, thereby further ensuring the safety of the person.

Further, in the present invention, it is sufficient to simply install the vision sensor 11 and simply teach the stopping positions and the passing positions of the robot 10 to the image processing unit 25. The present invention can be applied to an existing system without changing the robot 10 side. Accordingly, the present invention, unlike the prior art, can exclude the need of changing the software programs and circuits of the robot. Further, in the present invention, the burden on the operator at the time of teaching can be eased and a high skill level is not required for the operator.

In an unillustrated embodiment, the signal output unit 12 may be provided with only at least one of the first output portion 12*a* and the second output portion 12*c*. For example, the signal output unit 12 may be provided with only the first output portion 12*a* and the second output portion 12*c*.

Alternatively, the signal output unit 12 may be provided with only the first output portion 12*a*. In this case, if the first output portion 12*a* does not output the entry permission signal, i.e., the first output portion 12*a* is switched off, and therefore it is not permissible for a person to enter the predetermined section.

Further alternatively, the signal output unit 12 may be provided with only the second output portion 12*c*. In this case, if the second output portion 12*c* does not output the entry disabling signal, i.e., the first output portion 12*a* is switched off, and therefore it is permissible for a person to enter the predetermined section.

In either of the above two cases, it is also possible for a person to easily determine whether or not it is now safe to enter the predetermined section by simply watching the signal output unit 12. Further, it is possible to reduce the number of the output portions, and in this instance, it is possible to reduce the size and cost of the signal output unit 12.

The present invention has been described by way of the typical embodiments, and it will be understood that the foregoing alterations, various other alterations, omissions, and/or additions can be made by a person skilled in the art without departing from the scope of the present invention.

What is claimed is:

1. A robot system, comprising:
   a robot which is provided in a robot operating section;
   a robot controller configured to control an operation of the robot in the robot operating section;
   an imaging unit configured to image a predetermined section which includes at least a portion of the robot operating section;
   the robot controller comprising an image processing unit configured to process images taken by the imaging unit;
   an entry request unit which is to be operated when a person requests to enter the predetermined section; and
   a signal output unit which is configured to, in a case where the person has requested through the entry request unit to enter the predetermined section, output, depending on a processing result of the image processing unit, an entry permission signal indicating that the person is permitted to enter the predetermined section;
   wherein when the image processing unit detects that the robot has reached a stopping position taught in advance after the person requested to enter the predetermined section while the robot operates according to a predetermined operation program, the stopping position being a position where the robot or a portion of the robot system is to be stopped to enable the person to enter the predetermined section, the signal output unit is configured to output:
   at least one of
      (i) an instruction to stop the robot and
      (ii) an instruction to stop the portion of the robot system which is necessary to enable the person to enter the predetermined section, and
   the entry permission signal.

2. The robot system according to claim 1, wherein the signal output unit is configured to output, depending on the processing result of the image processing unit, either an entry disabling signal indicating that the person is not permitted to enter the predetermined section when the robot is operating, or the entry permission signal.

3. The robot system according to claim 2, wherein the signal output unit includes at least one of
   a first output portion configured to output the entry permission signal, and
   a second output portion configured to output the entry disabling signal,
   in the case where the signal output unit includes the first output portion but not the second output portion, the person is not permitted to enter the predetermined section when the first output portion does not output the entry permission signal, with the first output portion being disposed such that it is recognizable to the person,
   in the case where the signal output unit includes the second output portion but not the first output portion, the person is permitted to enter the predetermined section when the second output portion does not output the entry disabling signal, with the second output portion being disposed such that it is recognizable to the person, and
   in the case where the signal output unit includes both the first output portion and second output portion, the first output portion and second output portion are disposed such that they are recognizable to the person.

4. The robot system according to claim 3, wherein the signal output unit is configured to output the entry permission signal, the entry disabling signal, and the entry preparation signal visually or audibly, or both, such that the entry permission signal, the entry disabling signal, and the entry preparation signal are different from one another.

5. The robot system according to claim 1, wherein when it is detected by the image processing unit that the person has exited the predetermined section, the portion of the robot system or the robot is configured to be restarted.

6. The robot system according to claim 1, wherein when it is detected by the image processing unit, after the signal output unit outputted the entry permission signal, that the operation of the robot has been started, at least one of the portion of the robot system and the robot is configured to be stopped.

7. The robot system according to claim 1, wherein
the image processing unit is configured to
determine that a moving body is the person when the moving body includes a worn article image model of an article worn by the person, and
determine that the moving body is a foreign object when the moving body does not include the worn article image model, and
when the moving body, which was determined as being the foreign object is detected in the predetermined section, at least one of the portion of the robot system and the robot is configured to be stopped.

8. The robot system according to claim 1, wherein when the image processing unit loses sight of the person before the image processing unit detects that the person has exited the predetermined section, at least one of the portion of the robot system and the robot is configured to be stopped.

9. The robot system according to claim 1, wherein when the image processing unit determines that a moving body in the predetermined section is the person before the signal output unit outputs the entry permission signal, at least one of the portion of the robot system and the robot is configured to be stopped.

10. The robot system according to claim 1, wherein the stopping position is set on a path of working motion of the robot and is taught in advance.

11. The robot system according to claim 1, wherein the stopping position is set on a path of operation of the robot and is taught in advance,
wherein a passing position of the robot is taught at a predetermined distance upstream from the stopping position on the path, and
wherein when it is detected by the image processing unit that the robot has reached the passing position, the signal output unit is configured to output an entry preparation signal which indicates that the entry request unit is operable by the person.

12. The robot system according to claim 11, wherein the stopping position or the passing position is defined as a space of predetermined size, and wherein when it is detected by the image processing unit that the robot has reached the space, it is determined that the robot has reached the stopping position or the passing position.

13. The robot system according to claim 11, wherein the signal output unit includes
a first output portion configured to output the entry permission signal,
a second output portion configured to output an entry disabling signal indicating that the person is not permitted to enter the predetermined section, and
a third output portion configured to output the entry preparation signal, and
the first output portion, the second output portion, and the third output portion are disposed such that they are recognizable to the person.

14. The robot system according to claim 1, wherein the stopping position is defined as a space of predetermined size, and wherein when it is detected by the image processing unit that the robot has reached the space, it is determined that the robot has reached the stopping position.

15. The robot system according to claim 1, wherein the robot controller is configured to stop the robot either after decelerating or by cutting off the power of the robot.

16. A robot system, comprising:
a robot which is provided in a robot operating section;
a robot controller configured to control an operation of the robot in the robot operating section;
an imaging unit configured to image a predetermined section which includes at least a portion of the robot operating section;
a processor configured to process images taken by the imaging unit;
an entry request unit which is to be operated when a person requests to enter the predetermined section; and
a signal output unit which is configured to, in a case where the person has requested through the entry request unit to enter the predetermined section, output, depending on a processing result of the processor, an entry permission signal indicating that the person is permitted to enter the predetermined section;
wherein when the processor detects that the robot has reached a stopping position taught in advance after the person requested to enter the predetermined section while the robot operates according to a predetermined operation program, the stopping position being a position where the robot or a portion of the robot system is to be stopped to enable the person to enter the predetermined section, the signal output unit is configured to output:
at least one of
(i) an instruction to stop the robot and
(ii) an instruction to stop the portion of the robot system which is necessary to enable the person to enter the predetermined section, and
the entry permission signal.

* * * * *